United States Patent
Wend

(10) Patent No.: US 9,440,791 B2
(45) Date of Patent: Sep. 13, 2016

(54) ASSEMBLY AND METHOD FOR ARRANGING HANGING GOODS IN A SPACE-SAVING MANNER

(71) Applicant: Dürkopp Fördertechnik GmbH, Bielefeld (DE)

(72) Inventor: Michael Wend, Bielefeld (DE)

(73) Assignee: DÜRKOPP FÖRDERTECHNIK GMBH, Bielefeld (DE)

( * ) Notice: Subject to any disclaimer, the term of this patent is extended or adjusted under 35 U.S.C. 154(b) by 0 days.

(21) Appl. No.: 14/667,724

(22) Filed: Mar. 25, 2015

(65) Prior Publication Data

US 2015/0274425 A1 Oct. 1, 2015

(30) Foreign Application Priority Data

Mar. 25, 2014 (DE) .................. 10 2014 205 545

(51) Int. Cl.
| | |
|---|---|
| *B65G 9/00* | (2006.01) |
| *B65G 47/60* | (2006.01) |
| *B65G 47/64* | (2006.01) |
| *B65G 47/71* | (2006.01) |
| *B65G 1/04* | (2006.01) |

(Continued)

(52) U.S. Cl.
CPC .............. *B65G 9/00* (2013.01); *B65G 1/0457* (2013.01); *B65G 9/004* (2013.01); *B65G 9/006* (2013.01); *B65G 9/008* (2013.01); *B65G 47/261* (2013.01); *B65G 47/648* (2013.01); *B65G 47/71* (2013.01); *B65G 19/025* (2013.01); *B65G 2201/0229* (2013.01)

(58) Field of Classification Search
CPC ........ B65G 9/00; B65G 9/006; B65G 9/008; B65G 47/61; B65G 47/64; B65G 47/644; B65G 47/69; B65G 47/71; B65G 19/025; B65G 17/20
USPC .......................................... 198/465.4, 347.4
See application file for complete search history.

(56) References Cited

U.S. PATENT DOCUMENTS

| | | | | |
|---|---|---|---|---|
| 3,828,682 | A | * | 8/1974 | Klein ..................... D01H 9/182 104/88.01 |
| 4,917,228 | A | * | 4/1990 | Ichihashi ................ B05B 12/14 104/88.03 |
| 4,944,635 | A | | 7/1990 | Carlier et al. |

(Continued)

FOREIGN PATENT DOCUMENTS

| | | |
|---|---|---|
| DE | 2227105 A | 12/1973 |
| DE | 4100234 A1 | 7/1992 |

(Continued)

OTHER PUBLICATIONS

European search report dated Jul. 27, 2015, in corresponding European application No. 15 157 912.5.

*Primary Examiner* — Mark A Deuble
(74) *Attorney, Agent, or Firm* — Browdy and Neimark, PLLC

(57) ABSTRACT

An assembly for arranging hanging goods in a space-saving manner, in particular for forming a block of hanging goods to be stored in a high bay warehouse, comprises a feeding unit for feeding the hanging goods along a transport direction and an arrangement unit for arranging the hanging goods, wherein the arrangement unit is provided with at least two transport rails arranged adjacent to one another when seen in the transport direction.

19 Claims, 4 Drawing Sheets

(51) Int. Cl.
   *B65G 47/26*   (2006.01)
   *B65G 19/02*   (2006.01)

(56) References Cited

U.S. PATENT DOCUMENTS

| | | | | |
|---|---|---|---|---|
| 5,799,769 A * | 9/1998 | Heer | B65G 19/025 | 198/349 |
| 6,698,575 B2 * | 3/2004 | Gartner | B65G 19/025 | 198/465.4 |
| 7,270,226 B2 * | 9/2007 | Ostrom | B64F 1/368 | 198/347.4 |
| 7,331,440 B2 * | 2/2008 | Lafontaine | B65G 1/08 | 198/347.4 |
| 7,963,384 B2 * | 6/2011 | Lafontaine | B65G 1/1378 | 198/347.4 |
| 2012/0193307 A1 | 8/2012 | Gardelle et al. | | |
| 2013/0264171 A1 | 10/2013 | Wend et al. | | |
| 2015/0210482 A1 * | 7/2015 | Sieksmeier | B65G 43/08 | 700/230 |

FOREIGN PATENT DOCUMENTS

| | | |
|---|---|---|
| DE | 4213122 A1 | 10/1993 |
| DE | 9413209 U1 | 11/1994 |
| DE | 29510243 U1 | 10/1996 |
| DE | 20108190 U1 | 2/2002 |
| DE | 102008025975 A1 | 12/2009 |
| DE | 102012205735 A1 | 10/2013 |
| EP | 0310102 A1 | 4/1989 |
| EP | 1293455 A1 | 3/2003 |
| WO | 2011004131 A1 | 1/2011 |

* cited by examiner

ASSEMBLY AND METHOD FOR ARRANGING HANGING GOODS IN A SPACE-SAVING MANNER

CROSS-REFERENCE TO RELATED APPLICATIONS

This application claims the priority of German Patent Application, Serial No. DE 10 2014 205 545.8, filed on 25 Mar. 2014, pursuant to 35 U.S.C. 119(a)-(d), the content of which is incorporated herein by reference in its entirety as if fully set forth herein.

FIELD OF THE INVENTION

The method relates to an assembly and a method for arranging hanging goods in a space-saving manner, in particular in order to form a block of hanging goods for said block to be stored in a high bay warehouse.

BACKGROUND OF THE INVENTION

DE 10 2012 205 735 A1 discloses an accumulation zone for a conveyor system in a high bay warehouse. The accumulation zone allows a block of hanging goods to be formed which is then transported to a high bay for storage.

SUMMARY OF THE INVENTION

An object of the invention is to improve an assembly and a method for arranging hanging goods in a space-saving manner such that the hanging goods can be arranged and, if necessary, stored in a high bay warehouse reliably and efficiently, in particular such that an increased hanging goods density is achieved.

This object is achieved according to the invention by an assembly for arranging hanging goods in a space-saving manner, the assembly comprising a feeding unit for feeding the hanging goods in a transport direction, an arrangement unit for arranging the hanging goods, wherein the arrangement unit has at least two transport rails arranged adjacent to one another in the transport direction. It was recognized according to the invention that an arrangement unit for arranging hanging goods has at least two transport rails arranged next to one another. The transport rails are arranged next to one another relative to a transport direction along which the hanging goods are transported in the assembly. In particular, the transport rails are arranged parallel to each other and in particular to the transport direction. This allows the hanging goods fed from an incoming goods department, for example, to the arrangement unit in particular by means of a feeding unit to be arranged in the arrangement unit as densely as possible. The hanging goods arranged in the arrangement unit form a block of hanging goods. Said block has a greatest possible density of hanging goods. In the transport direction, the hanging goods are arranged at increased density. Furthermore, it is possible to increase the total density of the hanging goods in the arrangement unit. In particular, a distance between two adjacent transport rails is smaller than a width of the hanging goods. The width of the hanging goods is oriented perpendicularly to the transport direction. The hanging goods of adjacent transport rails may be arranged such as to overlap with each other. This in particular means that hanging goods arranged at a first transport rail may come into contact with hanging goods arranged at a second transport rail. The hanging goods in particular come into contact with each other in the region of front surfaces which are in particular oriented perpendicularly to the transport direction. The assembly, in particular the arrangement unit, allow the hanging goods to be arranged in a space-saving manner, in particular in a direction perpendicular to the transport direction. The hanging goods are each received by conveyor rails of the conveyor system by means of a respective adapter. The hanging goods are in particular pieces of clothing provided on clothes hangers. One clothes hanger each is received in a respective adapter. In contrast to an arrangement unit comprising only one transport rail, the assembly according to the invention allows hanging goods to be arranged more densely especially if a length of the adapter along the transport direction is greater than a length of the piece of goods in the transport direction. Compared to an arrangement comprising only one transport rail, the assembly according to the invention allows the number of hanging goods contained in the block to be increased, in particular doubled. An arrangement unit comprising exactly two transport rails is particularly advantageous. It is however conceivable as well to provide more than two, for instance three, four, five or more than five transport rails to be arranged adjacent to each other in the arrangement unit. The assembly according to the invention allows a block of hanging goods to be formed such that a high hanging goods density is achieved, thus allowing the throughput of hanging goods to be increased. Forming the block and subsequently storing said block in the high bay warehouse is both efficient and reliable. Arranging the hanging goods in a space-saving manner according to the invention is beneficially applicable in many fields of material handling. Along with the advantageous formation, described above, of a block of hanging goods having an increased goods density, it is conceivable as well to install an assembly according to the invention in a high bay, thus allowing the hanging goods to be arranged in a space-saving manner in a high bay. The assembly according to the invention may also be used as a length requirement determination unit such that the hanging goods are arranged in a space-saving manner in the arrangement unit. By means of a sensor, the length of the hanging goods arranged in a space-saving manner in the transport direction is determined and transmitted to a control unit that may be arranged centrally. Consequently, this allows one to determine how much space will be needed for further handling of the hanging goods, in other words it allows one to determine a length of a clothes rack required to hang up the hanging goods.

In an advantageous embodiment, the assembly comprises a feed separating unit arranged upstream of the arrangement unit when seen in the transport direction for feeding the hanging goods in a separated manner. This ensures that the hanging goods are fed to the arrangement unit in a controlled and targeted manner.

In an advantageous embodiment, an assembly comprises a feed switch allowing the hanging goods to be fed to a respective one of the at least two transport rails in a targeted manner. The feed switch is in particular arranged along the transport direction between a feed separating unit and the arrangement unit. The feed switch allows hanging goods to be fed to one of the transport rails in a targeted manner to achieve a greatest possible hanging goods density in the arrangement unit when seen in the transport direction.

In an advantageous embodiment, the arrangement unit is configured as an accumulation unit which has an accumulation member for retarding the transport of the hanging goods along the at least two transport rails in the transport direction. The accumulation member is arranged at an end section of the accumulation unit. The hanging goods are accumulated in such a way that a further transport of the hanging goods is interrupted. A discharging unit is provided to discharge the hanging goods accumulated in the accumulation unit so as to be stored in a high bay warehouse, for example. The accumulation member is in particular arranged such as to face the discharging unit. The accumulation member is in particular configured as a double-wing door pivotable between an open position and a closed position. In the open position, the block of hanging goods can be transported from the accumulation unit to the discharging unit. In the closed position, a discharge of the hanging goods from the accumulation unit is prevented. When the accumulation member is in the closed position, the hanging goods are accumulated. Other configurations of the accumulation member are conceivable as well such as a single-wing door or accumulation members arranged directly on the transport rails to interrupt a further transport of an adapter carrying a piece of goods.

In an advantageous embodiment of the assembly, the arrangement unit has a stopping member for stopping the feeding of the hanging goods into the arrangement unit along the transport direction. The stopping member is arranged in an inlet section of the arrangement unit. The stopping member is in particular arranged such as to face the feeding unit. The stopping member ensures that the feeding of hanging goods into the arrangement unit is stopped as soon as the block of hanging goods is complete. The completeness of the block of hanging goods may be obtained from the number of hanging goods accumulated and/or the length of the goods accumulated in the transport direction.

In a particularly advantageous embodiment of the assembly, exactly one stopping member is provided which is assigned to all transport rails equally. In other words, it is in particular not necessary to provide a separate stopping member for each transport rail. As a result, the design of the assembly and in particular the components required for the assembly are less complex. In particular, the amount of effort involved in controlling the assembly is reduced as well if there is exactly one stopping member provided for all transport rails in order to stop the feeding of the hanging goods. The stopping member is oriented in particular transversely and in particularly perpendicularly to the transport direction.

In an advantageous embodiment of the assembly, the arrangement unit has a fill level sensor for detecting a fill level of the arrangement unit. The fill level of the arrangement unit is in particular obtained from the number of hanging goods arranged in the arrangement unit. Since each of the hanging goods is received in a standardized adapter by means of a clothes hanger, and each of the adapters has an identical length in the transport direction, the length of the block in the transport direction may be obtained directly from the number of hanging goods.

In a particularly advantageous embodiment of the assembly, the fill level sensor is provided with a reading unit for reading a hanging goods code assigned to a respective piece of goods. The hanging goods code is in particular attached to the respective adapter provided to receive the piece of goods, in particular by means of a clothes hanger. The hanging goods code may for instance be configured as a bar code or as a transponder. The reading unit is configured such as to be able to read the hanging goods code, in particular in an automated manner. In particular, the reading unit is in signal communication with a counting unit. The counting unit of the fill level sensor generates a fill level signal. As soon as a desired fill level is reached, the fill level sensor, which is in particular directly or indirectly connected to the stopping member of the arrangement unit, may transmit the fill level signal to the stopping member. In this case, the feeding of additional hanging goods into the arrangement unit is stopped by means of the stopping member. This ensures that the desired length of the block of hanging goods is not exceeded accidentally. As such it is prevented that a piece of goods needs to be separated from the block of hanging goods, with the result that the efficiency of handling the hanging goods is improved even more. It is in particular possible to identify a piece of goods that forms the end of a block.

In an advantageous embodiment, the assembly comprises a discharge separating unit arranged downstream of the arrangement unit when seen in the transport direction for discharging the hanging goods from the arrangement unit in a separated manner. This makes it easier for the hanging goods to be discharged from the at least two transport rails, arranged adjacent to one another, of the arrangement unit towards the discharging unit. Discharging the block of hanging goods may in particular also take place in an automated manner.

In an advantageous embodiment, the assembly comprises a discharge switch arranged downstream of the arrangement unit when seen in the transport direction for moving together the hanging goods accumulated along the at least two transport rails. In other words, the discharge switch allows the discharging unit to be provided with only one transport rail. It is in particular not necessary to provide the same number of transport rails in the discharging unit as in the arrangement unit.

In an advantageous embodiment, the assembly comprises a control unit for controlled transport of the hanging goods. The control unit is in particular in signal communication with the arrangement unit, a fill level sensor, a feed separating unit, a feed switch, a discharge separating unit, a discharge switch, an accumulation member and/or a stopping member. The control unit allows the hanging goods to be transported throughout the assembly in the transport direction in an automated manner.

Another object of the invention is to improve a method for arranging hanging goods in a space-saving manner, in particular for forming a block of hanging goods, in particular in order to store the hanging goods in a high bay warehouse, in such a way that said method can be performed more easily and efficiently.

This object is achieved according to the invention by a method for arranging hanging goods in a space-saving manner, in particular for storing the hanging goods in a high bay warehouse, the method comprising the steps of feeding the hanging goods in a transport direction by means of a feeding unit; distributing the hanging goods thus fed among at least two transport rails of an arrangement unit, said transport rails being arranged adjacent to one another in the transport direction; and arranging the hanging goods along the transport rails. It was recognized according to the invention that hanging goods fed in a transport direction, in particular by means of a feeding unit, are distributed in a space-saving manner among at least two transport rails of an arrangement unit. Relative to the transport direction, the transport rails are arranged adjacent and in particular parallel to one another and to the transport direction. This allows the hanging goods density in the arrangement unit to be increased. This in particular applies to hanging goods having a length in the transport direction that is smaller than a length of an adapter in the transport direction.

By means of the arrangement unit, the distributed hanging goods are arranged in a space-saving manner to form a block of hanging goods. Afterwards, the hanging goods can be discharged, in particular by means of a discharging unit, for instance to be stored in a high bay warehouse.

The advantages of the method according to the invention substantially correspond to the advantages of the assembly according to the invention to which reference is made herewith.

Further advantages, features, and details of the invention will be apparent from the ensuing description of an exemplary embodiment with reference to the drawing.

DESCRIPTION OF THE PREFERRED EMBODIMENT

Figure 1:
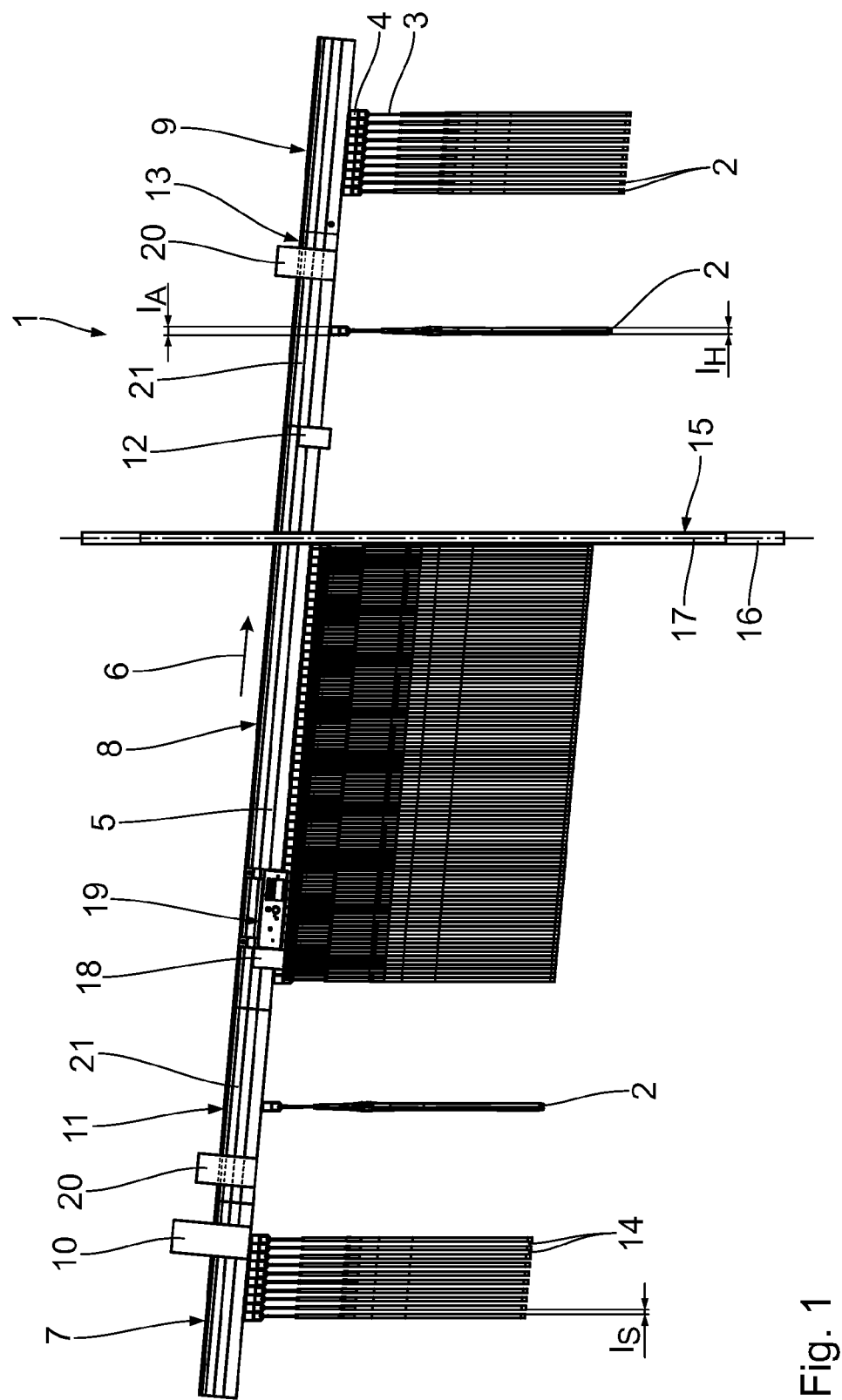
FIG. 1 shows a side view of an assembly according to the invention, an arrangement unit in the form of an accumulation unit being in a closed position in order to accumulate hanging goods.
Figure 2:
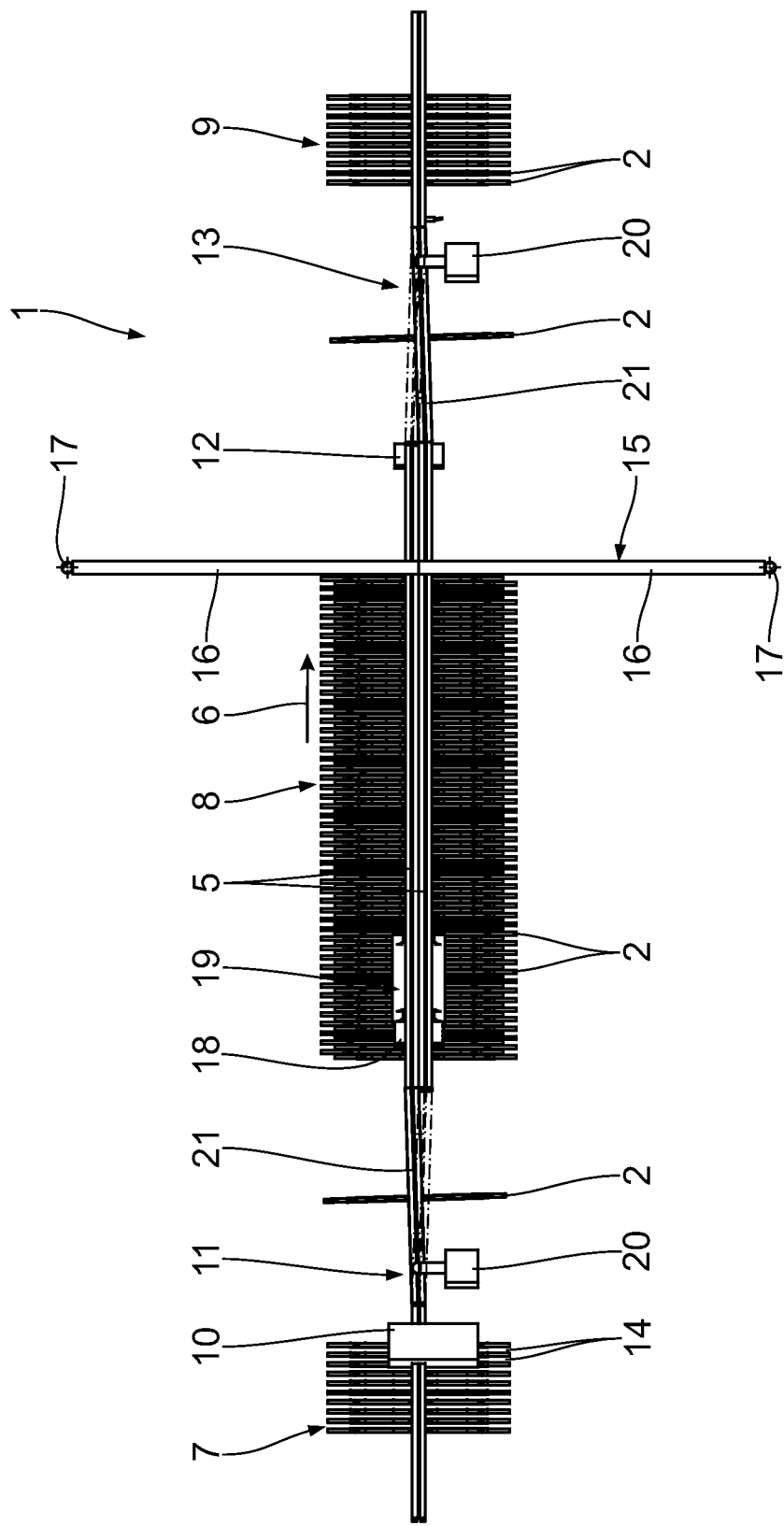
FIG. 2 shows a plan view, corresponding to FIG. 1, of the assembly.
Figure 3:
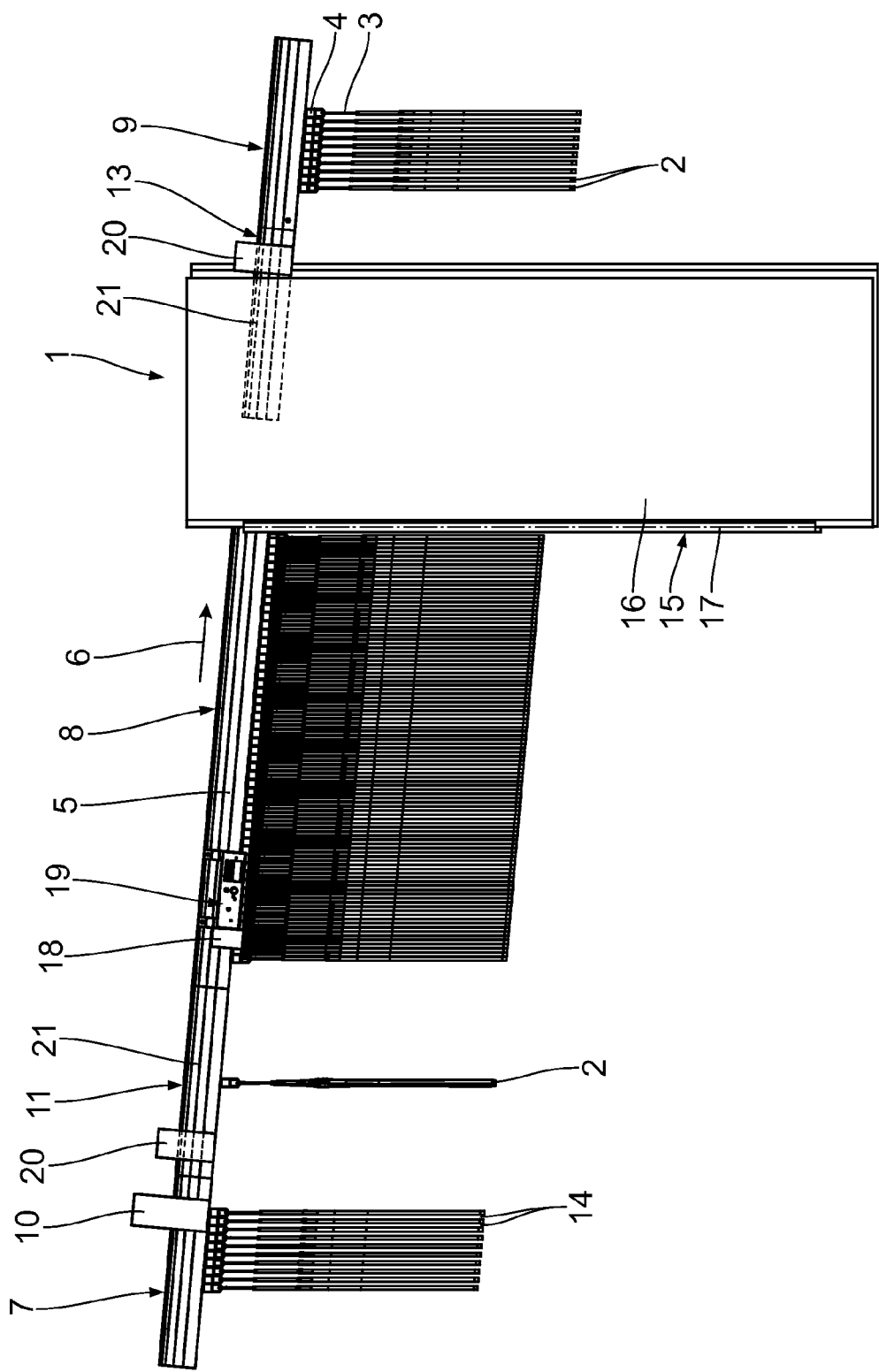
FIG. 3 shows a side view, corresponding to FIG. 1, of the assembly, the accumulation unit being in an open arrangement in order to discharge the hanging goods.
Figure 4:
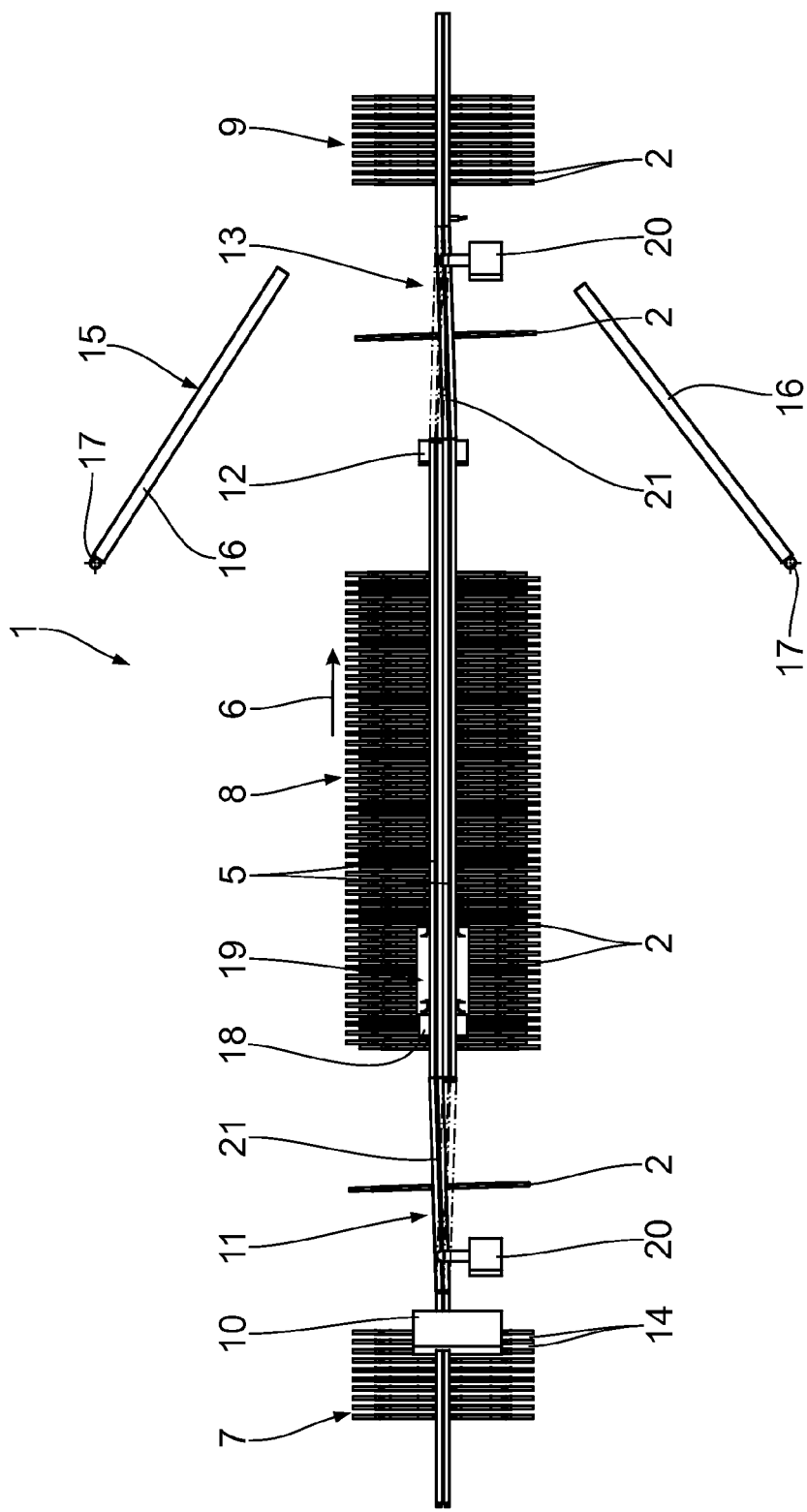
FIG. 4 a plan view, corresponding to FIG. 3, of the assembly.

FIGS. 1 to 4 show an assembly 1 which may for instance be provided in a conveyor system (not shown) for handling pieces of goods. The illustrated assembly is adapted to handle hanging goods 2. The hanging goods 2 are transported to the conveyor system for instance from an incoming goods department (not shown). The hanging goods 2 are, for instance, to be stored in a high bay warehouse (not shown). The assembly 1 allows a block of a number of hanging goods 2 to be formed in an automated manner for said block to be stored in the high bay warehouse.

According to the illustrated exemplary embodiment, the hanging goods 2 are pieces of clothing which are each hung up on a respective clothes hanger 3. The clothes hanger 3 is received in a receptacle of an adapter 4. The adapter 4 may be transported throughout the assembly 1 in a transport direction 6 along transport rails 5 provided for this purpose. As can in particular be seen from the side view according to FIGS. 1 and 3, the transport rails 5 are arranged such as to be inclined relative to the horizontal. An angle of inclination for instance amounts to between 1° and 20°, in particular between 5° and 15°, and in particular approximately 10°. In this respect, it is important to select the angle of inclination such as to allow for an automatic delivery of the hanging goods 2 along the transport rails 2, in particular as a result of gravity. As such the hanging goods 2 provided at the respective adapters 4 can be transported along the transport rails 5 automatically as a result of gravity. It is conceivable as well to provide an additional conveyor drive to facilitate the delivery, in other words the transport, of the adapters 4 in the transport direction 6.

The assembly 1 comprises a feeding unit 7 for feeding the hanging goods 2 in the transport direction 6. The assembly further comprises an arrangement unit which is configured as an accumulation unit 8 for accumulating the hanging goods 2. The assembly 1 further comprises a discharging unit 9 for discharging the accumulated hanging goods 2, for instance in order to store said hanging goods 2 in a high bay warehouse. Seen in the transport direction 6, the assembly 1 is configured such that the feeding unit 7 is arranged in a foremost position, followed by the accumulation unit 8 arranged downstream of the feeding unit 7 and by the discharging unit 9 arranged downstream of the accumulation unit 8. A feed separating unit 10 for feeding the hanging goods 2 in a separated manner as well as a feed switch 11 for feeding the hanging goods 2 in a targeted manner are arranged between the feeding unit 7 and the accumulation unit 8. Seen in the transport direction 6, a discharge separating unit 12 for discharging the hanging goods 2 from the accumulation unit 8 in a separated manner and a discharge switch 13 for moving together the accumulated hanging goods 2 are arranged between the accumulation unit 8 and the discharging unit 9.

According to the illustrated exemplary embodiment, each of the adapters 4 is provided with a hanging goods code by means of which the piece of goods 2 can be clearly identified. The code may for instance be configured as a bar code or as a transponder. Seen in the transport direction 6, the adapter 4 has an adapter length $l_A$ which is greater than a hanging goods length $l_H$ oriented in the transport direction 6. According to the illustrated exemplary embodiment, the adapter length $l_A$ amounts to for instance 22 mm. Typical hanging goods lengths $l_H$ amount to between 11 mm and 13 mm. Due to the fact that $l_A > l_H$, the hanging goods 2 are arranged such that there is a gap 14 between in each case two adjacent hanging goods 2 in the transport direction 6. The gap 14 has a gap length $l_S$ oriented in the transport direction 6. The gap length $l_S$ depends on the adapter length $l_A$ and the hanging goods length $l_H$, with $l_S = l_A - l_H$.

In the following sections, the accumulation unit 8 will be explained in more detail. The accumulation unit 8 comprises two identical transport rails 5 arranged parallel and adjacent to each other. A perpendicular connection line between the two transport rails 5 is in each case oriented horizontally, wherein there are different perpendicular connection lines due to the inclined arrangement of the transport rails 5. According to the illustrated exemplary embodiment, the transport rails 5 are arranged such as to be closely adjacent to each other. In particular, the two transport rails 5 abut against each other in the region of their side walls. It is conceivable as well to arrange the transport rails 5 at a distance from each other, wherein a maximum horizontal distance between the two transport rails 5 amounts to no more than 3 times the width of a transport rail 5, to no more than 2 times, and in particular to no more than 1.5 times the width of the transport rails 5. In this respect, it is important to ensure that the distance between the transport rails 5 is as small as possible. The accumulation unit 8 has a particularly compact and rugged design. The transport rails 5 of the accumulation unit 8 form a unit and are rigidly connected to each other. Spacers allowing the transport rails 5 to be arranged at a defined distance from each other are not required.

Seen in the transport direction 5, the hanging goods 2 are arranged on each case one of the two transport rails 5 in the accumulation unit 8 in an alternating manner. As a result, the hanging goods density in the transport direction 5 can be increased since one piece of goods 2 provided on one transport rail 5 is arranged in a gap 14 between two adjacent hanging goods 2 provided on the other transport rail 5.

According to the illustrated embodiment, the assembly 1 comprises exactly two transport rails. Depending on the adapter length $l_A$ and the hanging goods length $l_H$, it may be advantageous to provide more than two transport rails 5 in the accumulation unit 8.

The accumulation unit 8 comprises an accumulation member 15 in the form of a double-wing door. Each of the two wings 16 is configured such as to be pivotable about a vertical pivot axis 17. In the closed arrangement of the accumulation member 15 shown in FIGS. 1, 2, each of the wings 16 is arranged perpendicularly to the transport direction 6 (cf. FIG. 2). In this configuration, the hanging goods 2 are unable to pass through the accumulation member 15. The hanging goods 2 are accumulated at the accumulation member 15 of the accumulation unit 8, thus causing the block of hanging goods 2 to form.

In the accumulated configuration of the hanging goods 2, no gap is provided between two hanging goods 2 arranged adjacent to each other in the transport direction 6. It is conceivable as well that in the accumulated configuration, there is a gap between two respective hanging goods 2 in the accumulation unit 8. In any case, a gap between two hanging goods 2 arranged adjacent to each other in the accumulation unit 8 is smaller, in other words it has a smaller gap length, than the gap 14 between two adjacent hanging goods 2 in the feeding unit 7. Due to the fact that the gap length in the accumulation unit 8 is smaller than in the feeding unit 7, the hanging goods 2 are arranged more densely in the accumulation unit 8 than in the feeding unit 7.

Hanging goods 2 arranged adjacent to each other in the transport direction 6 are arranged on different transport rails 5. The accumulation member 15 allows all of the hanging goods 2 to be accumulated in the accumulation unit 8, in particular irrespective of the transport rail 5 on which the hanging goods 2 are arranged. The accumulation member 15 is located at an end section of the accumulation unit 8. The accumulation member 15 is arranged such as to face the discharging unit 9.

The accumulation unit 8 is further provided with a stopping member 18 facing the feeding unit 7. The stopping member 18 is used to stop the feeding of the hanging goods 2. The stopping member 18 extends in a horizontal direction perpendicular to the transport direction 6 across both transport rails 5. The stopping member 18 is adapted to stop the feeding of the hanging goods 2 along all of the transport rails 5.

The accumulation unit 8 further comprises a fill level sensor 19 adapted to detect a fill level of the accumulation unit 8. The fill level of the accumulation unit 8 in particular refers to the number of hanging goods 2 in the accumulation unit 8. The fill level sensor 19 may for instance be provided with a reading unit (not shown) adapted to read the hanging goods code of the respective piece of goods 2. To this end, the fill level sensor 19 is arranged on the transport rails 5 such as to allow for an in particular automated reading of the hanging goods codes provided at the adapters 4. According to the illustrated exemplary embodiment, the fill level sensor 19 is arranged at a lower side of the transport rails 5, in other words it is arranged such as to face the hanging goods 2 and the adapters 4. The reading unit integrated in the fill level sensor 19 may thus be arranged in a vertical direction below the transport rails 5 and oriented horizontally to read the adapter provided with the hanging goods codes, said adapter protruding from the transport rail 5 in a downward direction.

The feed switch 11 comprises a switch actuating member 20 as well as a switch blade 21 actuable by means of the switch actuating member 20. The actuating member 20 is adapted to actuate the switch blade 21 such that the hanging goods 2 are either fed to the one or to the other of the transport rails 5 of the accumulation unit 8. In other words, the switch blade 21 is displaceable such that in a first feeding configuration, the feeding unit 7 is connectable to the one transport rail 5 while in a second feeding configuration, the feeding unit 7 is connectable to the other transport rail 5. According to the exemplary embodiment shown in FIG. 2, the switch blade 21 is in the first feeding configuration. The piece of goods 2 arranged in the region of the feed switch 11 is fed to the first transport rail 5 shown at the top of FIG. 2.

Correspondingly, the discharge switch 13 is provided with an actuating member 20 and a switch blade 21 as well. The functioning of the discharge switch 13 corresponds to that of the feed switch 11. According to the state of the exemplary embodiment shown in FIG. 2, the switch blade 21 of the discharge switch 13 is in a second discharge configuration in which the discharging unit 9 is connected to the second transport rail 5 arranged at the bottom of FIG. 2.

The assembly according to the invention further comprises a control unit (not shown) which allows the hanging goods 2 to be transported throughout the assembly 1 in a controlled manner. In particular, the control unit is in signal communication with the fill level sensor 19, the feed separating unit 10, the feed switch 11, the discharge separating unit 12, the discharge switch 13, the accumulation member 15 and/or the stopping member 18 such that the block of hanging goods 2 is formed in an automated and automatic manner.

In the following sections, the method according to the invention for forming the block of hanging goods 2 to be stored in the high bay warehouse in an automatic manner will be explained in more detail with reference to FIGS. 1 to 4. Starting from the closed position of the accumulation member 15 according to FIGS. 1 and 2, the hanging goods 2 are at first transported from an incoming goods department (not shown) to the feeding unit 7. Due to the inclined arrangement of the transport rails 5, the adapters 4 move downwards such that an automatic transport is achieved in the transport direction 6 as a result of gravity. An automatic transport of the adapters 4 with the hanging goods 2 attached thereto is prevented by the feed separating unit 10. The feed separating unit 10 is able to release, in a controlled and/or regulated manner, in each case one piece of goods 2 to the feeding unit 7, in particular in a time-controlled manner. The released piece of goods 2 is thus separated for transport in the transport direction 6. The piece of goods 2 thus separated for transport is fed to the feed switch 11 where it is fed to either the one or the other transport rail 5 depending on the respective feed configuration. In the accumulation unit 8, the piece of goods 2 is transported up to the accumulation member 15. The accumulation member 15 prevents a further transport of the piece of goods 2. In the accumulation unit 8, the hanging goods 2 are accumulated as long as the accumulation member 15 is in the closed configuration, thus causing the block of hanging goods 2 to form. As time passes, in other words the more pieces of goods 2 are fed to the accumulation unit 8, the length of the block increases in the transport direction 6. The fill level sensor 19 detects the actual length of the block in the transport direction 6. As soon as a predefinable maximum block length is reached, the fill level sensor 19 is able to transmit a signal via the control unit (not shown) or to the stopping member 18 directly to prevent more hanging goods 2 from being fed to the accumulation unit 8. The block of hanging goods 2 thus formed is then discharged towards the discharging unit 9. To this end, the stopping member 18 is at first actuated such as to allow for further transport of the hanging goods 2 previously accumulated in the accumulation unit 8, wherein said transport in particular takes place automatically as a result of gravity. The hanging goods 2 are separated by the discharge separating unit 12 and fed to the switch blade 21 of the discharge switch 13 in a separated and in particular targeted manner. The actuating member 20 of the discharge switch 13 ensures that the hanging goods 2 in the accumulated configuration are removed by the two transport rails 5, in particular in an alternating manner. The open configuration of the wings 16 of the accumulation member 15 is visible in particular in FIG. 4. The Figure shows that the wings 16 have been pivoted about the vertical pivot axis 17 through in each case approximately 45°.

In particular if it is desired to transport different types of hanging goods 2 in the assembly 1, it is conceivable to change the feeding cycle, in other words the alternating feeding of the hanging goods 2, to a respective one of the transport rails 5. For instance, it is conceivable as well for two pieces of goods 2 arranged adjacent to each other in the feeding unit 7 when seen in the transport direction 6 to be moved to the same transport rail 5 of the accumulation unit 8, in particular if a piece of goods 2 previously fed to the other transport rail 5 has a particularly small length in the transport direction 6. The respective length of the piece of goods 2 may for instance be stored in the hanging goods code which is readable via the adapter. In particular, it is conceivable to provide at least a third transport rail 5 in the accumulation unit 8 to provide for a redundancy in case one of the transport rails fails and is no longer available for an operation of the assembly 1. In this case, there are still two transport rails 5 left which ensure a trouble-free operation of the assembly 1.

In another exemplary embodiment (not shown), the assembly according to the invention is integrated in a high bay warehouse. This means that the high bay warehouse is provided with rails arranged adjacent to each other in the form of storage rails allowing the hanging goods to be stored in a space-saving manner. The transport rails are storage rails.

What is claimed is:

1. An assembly for arranging hanging goods in a space-saving manner (2), the assembly (1) comprising
   a. a feeding unit (7) for feeding the hanging goods (2) in a transport direction (6),
   b. an arrangement unit (8) for arranging the hanging goods (2),
   wherein the arrangement unit (8) has at least two transport rails (5) arranged adjacent to one another in the transport direction (6), and
   wherein the distance between two adjacent transport rails is smaller than the width of the hanging goods.

2. An assembly according to claim 1, comprising a feed separating unit (10) arranged upstream of the arrangement unit (8) when seen in the transport direction (6) for feeding the hanging goods (2) in a separated manner.

3. An assembly according to claim 1, comprising a feed switch (11) for the targeted feeding of the hanging goods (2) to a respective one of the at least two transport rails (5).

4. An assembly according to claim 1, wherein the arrangement unit (8) is configured as an accumulation unit which is provided with an accumulation member (15) for retarding the transport of the hanging goods (2) along the at least two transport rails (5) in the transport direction (6).

5. An assembly according to claim 1, wherein the arrangement unit (8) is provided with a stopping member (18) to stop the feeding of the hanging goods (2) into the arrangement unit (8) in the transport direction (6).

6. An assembly according to claim 5, wherein exactly one stopping member (18) is provided which is assigned to all transport rails (5) equally.

7. An assembly according to claim 1, comprising a discharge separating unit (12) arranged downstream of the arrangement unit (8) when seen in the transport direction (6) for discharging the hanging goods (2) from the arrangement unit (8) in a separated manner.

8. An assembly according to claim 1, wherein a discharging unit (9) is used to discharge the accumulated hanging goods (2).

9. An assembly according to claim 1, comprising a discharge switch (13) arranged downstream of the arrangement unit (8) when seen in the transport direction (6) for moving together the hanging goods (2) accumulated along the at least two transport rails (5).

10. An assembly according to claim 1, comprising a control unit for a controlled transport of the hanging goods (2).

11. An assembly according to claim 10, wherein the control unit is in signal communication with at least one of the group comprising a fill level sensor (19), a feed separating unit (10), a feed switch (11), a discharge separating unit (12), a discharge switch (13), an accumulation member (15) and a stopping member (18).

12. An assembly for arranging hanging goods in a space-saving manner (2), the assembly (1) comprising:
   a. a feeding unit (7) for feeding the hanging goods (2) in a transport direction (6),
   b. an arrangement unit (8) for arranging the hanging goods (2),
   wherein the arrangement unit (8) has at least two transport rails (5) arranged adjacent to one another in the transport direction (6),
   wherein the distance between two adjacent transport rails is smaller than the width of the hanging goods,
   wherein the arrangement unit (8) has a fill level sensor (19) for detecting a fill level of hanging goods (2) in the arrangement unit (8), and
   wherein the fill level sensor (19) has a reading unit that reads a hanging goods code assigned to a respective piece of goods (2).

13. An assembly according to claim 12, wherein the hanging goods code is in each case attached to an adapter (4) for receiving a clothes hanger (3).

14. A method for arranging hanging goods in a space-saving manner (2), the method comprising the steps of
   feeding the hanging goods (2) in a transport direction (6) by means of a feeding unit (7);
   distributing the hanging goods (2) thus fed among at least two transport rails (5) of an arrangement unit (8), said transport rails (5) being arranged adjacent to one another in the transport direction (6);
   arranging the hanging goods (2) along the transport rails (5),
   wherein the distance between two adjacent transport rails is smaller than the width of the hanging goods.

15. A method for arranging goods in a space-saving manner according to claim 14, wherein said method is used for storing the hanging goods (2) in a high bay warehouse.

16. A method according to claim 14, comprising a targeted feeding of the hanging goods (2) to a respective one of the at least two transport rails (5) by means of a feed switch (11).

17. A method according to claim 14, wherein two pieces of goods (2) arranged adjacent to one another in the feeding unit (7) when seen in the transport direction (6) are fed to different transport rails (5).

18. A method according to claim 14, comprising a detection of a fill level of the arrangement unit (8) by means of a fill level sensor (19), the fill level sensor (19) transmitting a signal to the control unit in order to release the accumulated hanging goods (2) to the discharging unit (9) as soon as a maximum fill level is reached.

19. A method according to claim 18, wherein the fill level sensor (19) is in a signal communication with a control unit.

* * * * *